Figure 1:
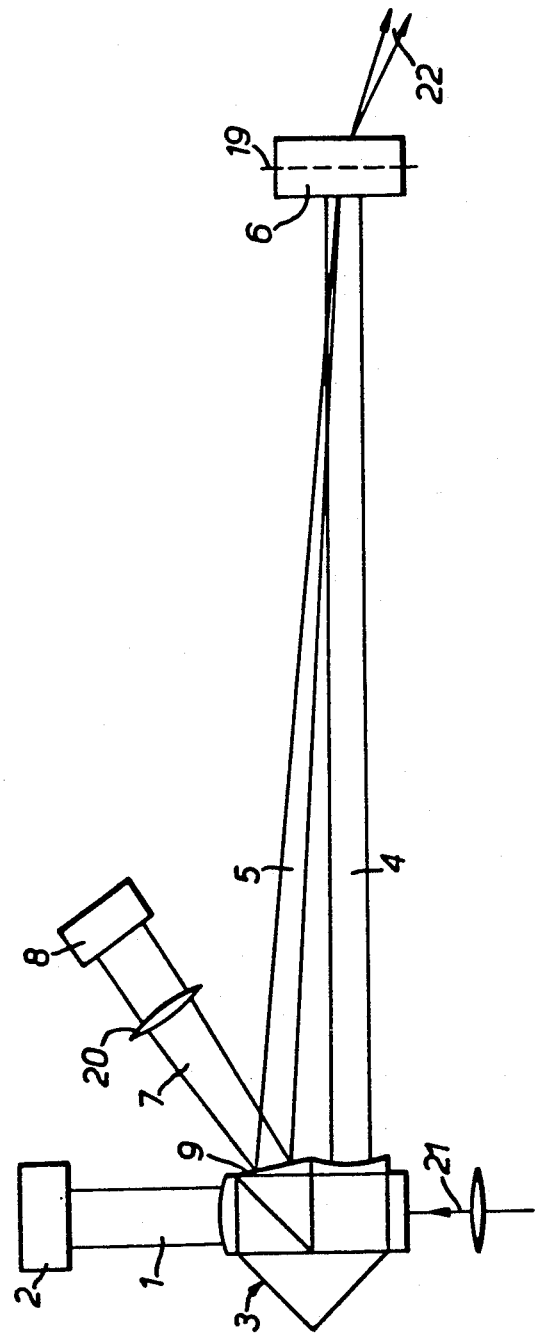

United States Patent [19]

Laycock

[11] Patent Number: 4,836,658
[45] Date of Patent: Jun. 6, 1989

[54] OPTICAL DEVICES FOR FORMING IMAGE AND REFERENCE BEAMS WITH A POLARIZING BEAMSPLITTER AND A SPATIAL LIGHT MODULATOR

[75] Inventor: Leslie C. Laycock, Amersham, England

[73] Assignee: The General Electric Company, p.l.c., England

[21] Appl. No.: 180,247

[22] Filed: Apr. 11, 1988

[30] Foreign Application Priority Data

Apr. 21, 1987 [GB] United Kingdom ............... 8709336

[51] Int. Cl.[4] .................. G02F 1/01; G03H 1/04; G02B 27/28
[52] U.S. Cl. .................. 350/384; 350/3.64; 350/394
[58] Field of Search .................. 350/3.64, 384, 394, 350/401, 402

[56] References Cited

U.S. PATENT DOCUMENTS 4,650,286  3/1987  Koda et al. ............... 350/402 X

Primary Examiner—John K. Corbin
Assistant Examiner—David J. Edmondson
Attorney, Agent, or Firm—Kirschstein, Kirschstein, Ottinger & Israel

[57] ABSTRACT

An optical device for use in forming a holographic record, comprising a polarizing beam splitter and a spatial light modulator arranged to derive from an incident beam a focussed image beam and a collimated reference beam, the device being of unitary construction and providing substantially equal path-lengths for the image and reference beams.

6 Claims, 2 Drawing Sheets

OPTICAL DEVICES FOR FORMING IMAGE AND REFERENCE BEAMS WITH A POLARIZING BEAMSPLITTER AND A SPATIAL LIGHT MODULATOR

The present invention relates to optical devices.

In particular the invention is concerned with optical devices for producing holographic records of images, for use for example in optical image processing. Such optical devices are required to produce from a common coherent light source a focussed beam bearing image information and a collimated reference beam, the two beams crossing, at as small an angle as possible, in the region of a record medium, such as a body of photorefractive material, in which the holographic record is to be formed.

Photorefractive materials, for example bismuth silicon oxide, have the characteristics of wide band-gap semiconductors, having receptor sites which form deep-level traps in the forbidden band. Where the image beam and the reference beam cross within a body of such material, the spatially non-uniform light intensity produced by interference between the two beams gives rise to a correspondingly non-uniform density distribution of electrons excited into the conduction band from donor sites.

In the subsequent diffusion or migration of electrons from regions of relatively high intensity illumination of regions of lower intensity illumunation some of the electrons are captured by the deep-level traps, so that the pattern of charge migration and the resultant space-charge field become "frozen" in the body of material, and the refractive index of the material is modified locally by the electro-optic effect to produce a phase hologram.

The two light beams incident on the body of photorefractive material must be of like polarization and preferably have followed equal path lengths, and the means used in manipulating the two beams must as far as possible be free from relative movement or vibration.

According to one aspect of the present invention an optical device for use in forming a holographic record of an image comprises a polarizing beam splitter which is arranged to derive from a single coherent-light incident beam two orthogonally polarized beams, one of which is used to form a reference beam while the other is arranged to be modulated in polarization by means of a spatial light modulator in dependence upon the image and reflected back to the beam splitter, where a component of the modulated beam is separated out to form an image beam.

According to another aspect of the present invention an optical device for producing a focussed image beam and a collimated reference beam of parallel polarization for use in forming a holographic record of an image, comprises a polarizing beam splitter for deriving from an incident beam orthogonally polarized reflected and transmitted beams, a spatial light modulator arranged to modulate the transmitted beam in polarization and to reflect the modulated beam back onto the polarizing beam splitter, means to direct the component of said modulated beam which is reflected by the beam splitter as the focussed image beam, and means to direct the first-mentioned reflected beam from said device as the collimated reference beam.

Preferably the paths followed by the image beam and the reference beam within the device are of substantially equal lengths. The polarizing beam splitter, the spatial light modulator and the means to direct the image and reference beams may be secured directly together to form a unitary structure.

Figure 2:
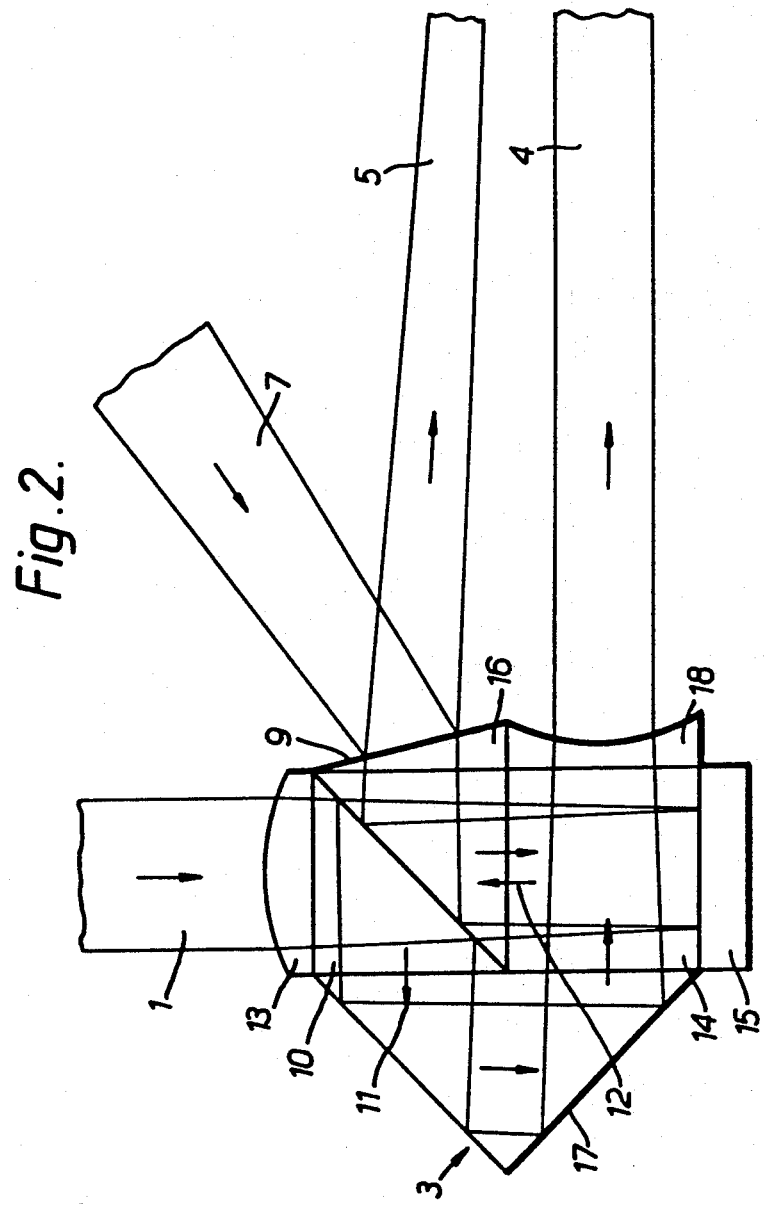

An optical device in accordance with the present invention for producing a holographic record of an image will now be described by way of example with reference to the accompanying drawings, of which:

FIG. 1 shows schematically means for producing a holograpic record of an image, and FIG. 2 shows part of the means of FIG. 1 on a larger scale.

Referring first to FIG. 1 a collimated beam of light 1 from a source 2 is directed onto a beam-manipulating optical device 3, which derives a collimated reference beam 4 and a focussed image beam 5 which are directed onto a body 6 of photorefractive material. The source 2 may comprise a Nd:YAG laser, and the beam 1 may be at the second harmonic at 532 nm, in the green region of the visible spectrum. The photorefractive material may be bismuth silicon oxide, which is suitably sensitive to light of this wavelength.

A focussed read beam 7 from a laser source 8, at a wavelength of, say, 633 nm in the red region of the visible spectrum, may be directed onto the body 6 by reflection from a surface 9 of the device 3.

Referring also to FIG. 2 the beam 1 is arranged to be plane polarized, either at the source 2 or subsequently, to control the ratio in which it is split by a polarizing beam splitter 10 into two orthogonally polarized beams, a reflected beam 11 and a transmitted beam 12. Before entering the beam splitter 10 the beam 1 passes through a converging lens element 13.

The transmitted beam 12 passes in one direction through a path-length compensating block 14 to a spatial light modulator 15, where it is modulated in polarisation in dependence upon an image focussed at the modulator 15 and the modulated beam reflected back through the block 14 to the beam splitter 10. On this second encounter with the beam splitter 10, the component which is reflected to form the focussed image beam 5 has a plane of polarization parallel to that of the beam 11 from which the collimated reference beam 4 is formed. On exit from the device 3 the image beam 5 is refracted through an angle of, say, 0.03 radians by a narrow-angle prism 16.

The reflected beam 11 passes through a "delay" prism 17, transversely through the path-length compensating block 14, and out through a diverging lens element 18. The power of the lens element 18 is such that it exactly compensates for the converging effect of the lens element 13 to produce a collimated beam 4. The power of the lens element 13 and the deflection of the beam 5 introduced by the prism 16 are such that the focussed beam 5 and the collimated beam 4 cross at the focal plane 19 of the lens element 13. It will be appreciated that this focal plane 19 is displaced by virtue of the "folding" of the optical path through the device 3. The block 6 of photorefractive material is placed so that the focal plane 19 of the lens element 13 pases through it.

Since the beam passing through the prism 16 is converging this will produce a form of transverse coma in the focal plane 19 of some five microns as compared to the diffraction limited spot size of some thirty microns.

The focussed read beam 7 is reflected by the surface 9 of the prism 16 so as in general to follow the same path as the beam 5 to the block 6, the converging lens element 20 which produces the focussed beam 7 having a focal plane coincident with the plane 19. The surface 9 of the prism 16 may have a dichroic coating such that it efficiently reflects red light at 633 nm while transmitting green light at 532 nm. The outer surfaces of the lens elements 13 and 18 may be provided with anti-reflective coatings for the green light at 532 nm.

The elements 10, 13, 14, 15, 16, 17 and 18 may be cemented to form a unitary structure by means of a refractive index matched adhesive.

The possibility of equalising the path lengths of the focussed image beam and the collimated reference beam eliminates the need for a long coherence length laser, and the structure provides a solid and compact low-loss means for producing the two beams and for conveniently interrogating the spatial light modulator.

It will be appreciated that with a slightly different geometry the beam first reflected by the polarizing beam splitter, referenced 11 in the description above, could be used to form the image beam.

The image in respect of which a record is to be made may be focussed at the spatial light modulator 15 by way of an optical path indicated by the reference 21, while the beam arising from the read-out of the holographic record formed in the block 6 may follow a path indicated by the reference 22.

I claim:

1. An optical device for use in forming a holographic record of an image comprising a polarizing beam splitter which is arranged to derive from a single coherent-light incident beam two orthogonally polarized beams, one of which is used to form a reference beam while the other is arranged to be modulated in polarization by means of a spatial light modulator in dependence upon the image and reflected back to the beam splitter, where a component of the modulated beam is separated out to form an image beam.

2. An optical device for producing a focussed image beam and a collimated reference beam of parallel polarization for use in forming a holographic record of an image, comprising a polarizing beam splitter for deriving from an incident beam orthogonally polarized reflected and transmitted beams, a spatial light modulator arranged to modulate the transmitted beam in polarization and to reflect the modulated beam back onto the polarizing beam splitter, means to direct the component of said modulated beam which is reflected by beams splitter as the focussed image beam, and means to direct the first-mentioned reflected beam from said device as the collimated reference beam.

3. An optical device in accordance with claim 2 wherein said incident beam passes through a converging lens element before encountering the polarizing beam splitter, and said means to direct the first-mentioned reflected beam includes a diverging lens element.

4. An optical device in accordance with claim 3 wherein said means to direct the reflected component of said modulated beam includes a narrow-angle prism.

5. An optical device in accordance with claim 4 wherein the path of said first-mentioned reflected beam through the device includes an internally reflecting prism and a path-length equalizing block.

6. An optical device in accordance with claim 5 wherein the polarizing beam splitter, the converging and diverging lens elements, the path-length equalizing block, the narrow-angle prism and the internally reflected prism are all cemented to form a unitary structure by means of a refractory index matched adhesive.

* * * * *